US012657662B2

(12) United States Patent
Ruster et al.

(10) Patent No.: US 12,657,662 B2
(45) Date of Patent: Jun. 16, 2026

(54) SENSOR SYSTEM AND METHOD FOR SENSING A PHYSICAL QUANTITY

(71) Applicants:Rohde & Schwarz GmbH & Co. KG, Munich (DE); University of Basel, Basel (CH)

(72) Inventors: Thomas Ruster, Munich (DE); Melvyn Ho, Munich (DE); Philipp Treutlein, Basel (CH); Yongqi Shi, Basel (CH)

(73) Assignees: Rohde & Schwarz GmbH & Co. KG, Munich (DE); University of Basel, Basel (CH)

( * ) Notice: Subject to any disclaimer, the term of this patent is extended or adjusted under 35 U.S.C. 154(b) by 365 days.

(21) Appl. No.: 18/345,637

(22) Filed: Jun. 30, 2023

(65) Prior Publication Data

US 2025/0005711 A1     Jan. 2, 2025

(51) Int. Cl.
*G06T 5/10*          (2006.01)
*G06T 5/20*          (2006.01)
*G06V 10/70*         (2022.01)

(52) U.S. Cl.
CPC ................. *G06T 5/10* (2013.01); *G06T 5/20* (2013.01); *G06V 10/70* (2022.01)

(58) Field of Classification Search
CPC .................... G01N 21/3103; G01N 2021/646
See application file for complete search history.

(56) References Cited

U.S. PATENT DOCUMENTS

| | | | |
|---|---|---|---|
| 4,548,464 A | 10/1985 | Auracher et al. | |
| 2017/0185037 A1* | 6/2017 | Lee | G03H 1/16 |
| 2018/0254597 A1* | 9/2018 | Van Der Post | H01S 3/0959 |
| 2019/0206070 A1* | 7/2019 | Nash | G06T 7/37 |
| 2023/0137266 A1* | 5/2023 | McBride | G01V 8/005 250/389 |
| 2023/0387926 A1* | 11/2023 | Fujisaku | H03L 7/26 |
| 2024/0027958 A1* | 1/2024 | Midtvedt | G03H 1/0465 |
| 2024/0377485 A1* | 11/2024 | Mizuochi | G01R 21/00 |
| 2025/0003805 A1* | 1/2025 | Schmidt | G01J 5/53 |

* cited by examiner

*Primary Examiner* — Benjamin O Dulaney
(74) *Attorney, Agent, or Firm* — Studebaker Brackett PLLC

(57)          ABSTRACT

The present disclosure relates to a sensor system sensing a physical quantity. The system includes an excitation source for generating an excitation signal. A sensing volume includes quantum system(s), wherein the sensing volume is arranged to receive the excitation signal. The excitation signal induces an emission and/or an adaption of an optical signal by the sensing volume. A characteristic(s) of the optical signal depends on the physical quantity. An imaging system applies a transformation to the optical signal, thereby generating a transformed optical signal at an image plane. A spatially dependent attenuator is arranged at the image plane and attenuates the transformed optical signal. An optical sensor captures the thus attenuated optical signal and detects an image formed by the optical signal. A processor extracts an information on the physical quantity from the captured image pattern.

15 Claims, 7 Drawing Sheets

Laser beam

70

71   Generating excitation signal

72   Receiving excitation signal

73   Appling a transformation

74   Attenuating the optical signal

75   Capturing the optical signal

76   Extracting the physical quantity

SENSOR SYSTEM AND METHOD FOR SENSING A PHYSICAL QUANTITY

TECHNICAL FIELD

The disclosure relates to sensor systems, in particular a quantum sensor system, and to a corresponding method for sensing a physical quantity.

BACKGROUND ART

Within the last years, there has been a lot of interest in sensing electromagnetic radiation (EM) or other physical quantities with quantum systems. The most common quantum systems include ground-state atoms, excited atoms (especially to Rydberg states), or atom-like systems. For instance, a quantum sensor, which employs such a quantum system, can detect EM radiation by an excitation of resonant transitions between two energy states in the quantum system.

Often, the quantum systems are read out optically. However, this approach has the problem that the influence of the quantum system on the optical readout signal can be obscured by noise. For instance, the number of photons which are measured during readout can be subject to photon shot noise, i.e., the measured signal fluctuates with a standard deviation (the square root of the number of photons). For a high number of photons, this shot noise can be quite high. Furthermore, a large number of photons means that the detector can be easily saturated and, thus, a detector with large dynamic range may be required, which is more expensive or might not be available.

SUMMARY

Thus, there is a need to provide an improved system and method for sensing a physical quantity which avoid the above-mentioned disadvantages.

This is achieved by the embodiments provided in the enclosed independent claims. Advantageous implementations of the present disclosure are further defined in the dependent claims.

According to a first aspect, the present disclosure relates to a sensor system for sensing a physical quantity. The sensing system comprises: an excitation source which is configured to generate an excitation signal; a sensing volume comprising one or more quantum systems, wherein the sensing volume is arranged to receive the excitation signal, wherein the excitation signal induces an emission and/or an adaption of an optical signal by the sensing volume, wherein at least one characteristic of the optical signal depends on the physical quantity; an imaging system which is configured to apply a transformation to the optical signal, thereby generating a transformed optical signal at an image plane; an spatially dependent attenuator which is arranged at the image plane and which is configured to attenuate the transformed optical signal; an optical sensor which is configured to capture the thus attenuated optical signal and to detect an image pattern of the attenuated optical signal; and a processor which is configured to extract an information on the physical quantity from the captured image pattern.

This achieves the advantage that, due to the attenuation of the transformed image, an optical noise in the detected readout signal can drastically be reduced. This can lead to a higher sensitivity of the sensor system. In addition, the photon counts on the pixels of the optical sensor can be reduced which, in turn, reduces the dynamic range requirements of the optical sensor. Thus, a simpler and potentially cheaper sensor can be used.

The quantum system(s) can comprise ground state or excited atoms, e.g. Rydberg atoms, in a gas, or atom-like systems, such as NV defects in a diamond solid. The excitation signal can excite resonances in the quantum system(s).

For example, the sensing volume and/or quantity to be measured may comprise an "inhomogeneity", such that the response of the sensor to the physical quantity is inhomogeneous as well (i.e., it contains a pattern that can be analyzed). This can be caused by the atoms at different positions in the sensing volume behaving differently (e.g. due to an inhomogeneous E/B-field), or if the signal to be measured is inhomogeneous (e.g. when it is coming from a focusing antenna or when measuring the field close to a waveguide).

The excitation signal can be an optical signal (e.g., a laser beam) which optically excites the quantum system, e.g., to an excited quantum state. The excitation signal can further excite resonant transitions in the quantum system(s). In addition or alternatively, also off-resonant interactions can be excited by the excitation signal.

The optical signal can be a luminescence or a fluorescence signal which is emitted in response to the excitation of the quantum system.

For example, the optical signal corresponds to the excitation signal after transmitting (and thus interacting with) the sensing volume. In this example, the optical signal is directly based on the excitation signal.

Alternatively, the excitation and detection signals can be separate signals from separate sources. For example, a strong laser is used for excitation (which prepares the quantum sensor to a certain initial state). However, this "excitation signal" is not read out by the camera. Instead, a weaker detection laser irradiates the sensing volume and is subsequently read out by the optical sensor, which is e.g. a camera.

The sensing volume and, in particular, the quantum system can be exposed to the physical quantity. The physical quantity can be an E-field, a B-field, an EM field, a pressure or a temperature, or a parameter thereof (e.g., an amplitude or field strength). For instance, the quantum system can be arranged to receive at least a part of the physical quantity (e.g., an E-field, B-field or EM field).

For example, the physical quantity (e.g., a static E or B field, temperature etc.) can shift or locally change energy levels and/or resonance frequencies of the atoms in the quantum system. This can affect the optical signal which can be locally modified due to the effect of the physical quantity on the quantum system. If the physical quantity is an electromagnetic (EM) signal, it may also cause resonant transitions in the quantum system, which may affect the optical readout signal.

For example, EM-fields may also have an effect on the quantum system if they are non-resonant. These off-resonant interactions are typically weaker, but may also be utilized for sensing.

The imaging system can be configured to image the optical signal on the optical sensor.

The optical sensor can comprise a camera or an array of photodiodes.

The image pattern of the (attenuated) optical signal, which is detected by the optical sensor, can be an intensity distribution or profile of the signal (i.e., the spatial profile of the optical signal). This distribution or profile can define an image that is captured at the optical sensor. The spatial profile of the optical signal can be correlated with frequency information of an EM wave to be measured. The exact image pattern that is captured can be caused by absorption and/or emission in the sensing volume.

The processor can be configured to map the image pattern respectively intensity distribution/profile to an information about the physical quantity. For instance, the physical quantity imprints a unique pattern (e.g., an absorption pattern) in the intensity distribution of the optical signal, wherein the processor detects this pattern and correlates it with the physical quantity. Thus, a characteristic of the optical signal (the exact intensity and/or frequency distribution) depends on the physical quantity.

The sensing volume can be a thin object which comprises one or more quantum systems, e.g. a sensing chip.

In an implementation form, the spatially dependent attenuator is an optical filter, for instance a line filter.

For instance, the attenuator can be a type of mask.

For example, the filter is configured to filter out DC components from the image pattern of the optical signal, e.g. from an image formed by the optical signal.

The sensor system can be a quantum sensor system.

In an implementation form, the imaging system comprises a first lens which is configured to apply a Fourier transformation to the image pattern of the optical signal. Thus, the transformed image pattern of the optical signal can be a Fourier transformed pattern. For instance, due to this Fourier transformation, the attenuator can filter out frequency components of the image.

For instance, the spatially dependent attenuator is arranged at the center of the Fourier image, because the center corresponds to low frequencies in the spectrum. Thus, the attenuator can effectively absorb the DC frequency components of the initial image formed by the optical signal.

In an implementation form, the imaging system comprises a second lens which is configured to apply an inverse Fourier transformation to the image pattern of the attenuated optical signal.

In an implementation form, the sensing volume comprises a diamond solid comprising one or more NV defects, wherein the optical signal is a fluorescence signal emitted by the sensing volume.

In an implementation form, the sensing volume comprises a gas, in particular a quantum gas, wherein the optical signal passes through the gas and is at least partially absorbed by the gas. This absorption can be caused by induced resonant transitions. The physical quantity to be analyzed can thereby imprint a unique absorption pattern in the optical signal.

In an implementation form, the sensor system further comprises a vapor cell configured to store the gas.

In an implementation form, the sensor system further comprises a field generator configured to generate an electric and/or magnetic field within the sensing volume.

The resonance frequency of the sensing volume, in particular of the quantum systems in the sensing volume, can be modified by the electric and/or magnetic field. For instance, the electric and/or magnetic field is inhomogeneous throughout the sensing volume and exhibits a local variation, e.g. a field gradient. As a consequence, a resonant frequency of the quantum system varies throughout the sensing volume which allows to detect the presence of different EM frequencies in the excitation signal and/or an EM signal to analyze.

The field generator can comprise a magnet and/or capacitor plates.

In an implementation form, the sensor system further comprises an element configured to guide and/or focus the physical quantity or an EM signal representative of the physical quantity towards the sensing volume.

For example, the element can be an antenna or a waveguide.

According to a second aspect, the present disclosure relates to a method for sensing a physical quantity. The method comprises the steps of: generating an excitation signal; receiving the excitation signal at a sensing volume which comprises one or more quantum systems; wherein the excitation signal induces an emission and/or an adaption of an optical signal by the sensing volume, wherein at least one characteristic of the optical signal depends on the physical quantity; applying a transformation to the optical signal, thereby generating a transformed optical signal at an image plane; spatially attenuating the transformed optical signal at the image plane; capturing the thus attenuated optical signal and detecting an image pattern of the attenuated optical signal; and extracting an information on the physical quantity from the captured image pattern.

The method can be a method for quantum sensing a physical quantity.

Hereby, spatially attenuating may refer to attenuating the optical signal with varying strength depending on spatial coordinates of the optical signal.

In an implementation form, the step of spatially attenuating the optical signal comprises filtering out DC components from the image pattern of the optical signal.

In an implementation form, the transformation that is applied to the optical signal is a Fourier transformation which is applied to the image pattern of the optical signal.

In an implementation form, an inverse Fourier transformation is applied to the image pattern of the attenuated optical signal.

In an implementation form, the method comprises the further step of: generating a magnetic and/or electric field in the sensing volume.

The above description with regard to the sensor system according to the first aspect of the present disclosure is correspondingly valid for the method according to the second aspect of the present disclosure.

In particular, the method according to the second aspect of the present disclosure can be carried out by the sensor system according to the first aspect of the present disclosure.

BRIEF DESCRIPTION OF THE DRAWINGS

The above-described aspects and implementation forms of the present disclosure will be explained in the following description of specific embodiments in relation to the enclosed drawings, in which.

DETAILED DESCRIPTIONS OF EMBODIMENTS

Figure 1:
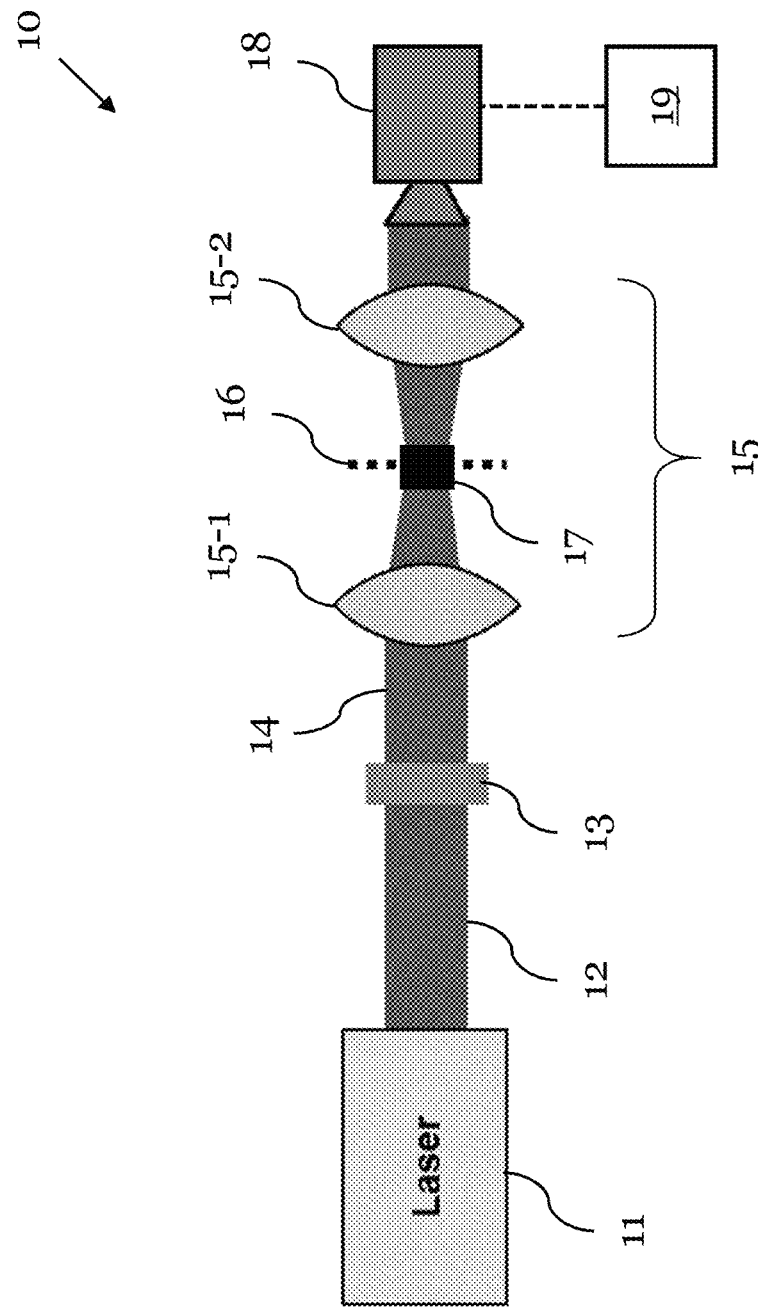
FIG. 1 shows a schematic diagram of a sensor system for sensing a physical quantity according to an embodiment.

FIG. 1 shows a schematic diagram of a sensor system 10 for sensing a physical quantity according to an embodiment.

The sensor system 10 comprises: an excitation source 11 which is configured to generate an excitation signal 12; and a sensing volume 13 comprising one or more quantum systems, wherein the sensing volume is arranged to receive the excitation signal 12, wherein the excitation signal 12 induces an emission and/or an adaption of an optical signal 14 by the sensing volume 13, and wherein at least one characteristic of the optical signal depends on the physical quantity. The sensor system 10 further comprises an imaging system 15 which is configured to apply a transformation to the optical signal 14 (in particular, of an image pattern of the optical signal), thereby generating a transformed optical signal at an image plane 16; an spatially dependent attenuator 17 which is arranged at the image plane 16 and which is configured to attenuate the transformed optical signal; an optical sensor 18 which is configured to capture the thus attenuated optical signal and to detect a an image pattern of the (attenuated) optical signal; and a processor 19 which is configured to extract an information on the physical quantity from the detected image pattern.

For example, the excitation source 11 is a laser which is configured to generate the excitation signal 12 in the form of a light beam.

The sensing volume 13 can be a thin object that comprises one or multiple quantum systems, such as a diamond plate with one or more NV defects, or hot atoms in a thin atomic vapor cell. The sensing volume 13 can be comprised in a so-called sensing chip.

In a transition analysis setup, as e.g. shown in FIG. 1, the quantum volume is typically a gas which is stored in a vapor cell. In this example, the quantum system(s) in the sensing volume 13 can absorb light which passes through the sensing volume 13. A quantum sensor system based on such a "transmission setup" can, for example, be used in atomic clocks or DC magnetometers.

For example, the optical excitation signal 12 is directed through the sensing volume where it interacts with the quantum system, e.g. by locally exciting resonant transitions in atoms of the quantum system. A part of the excitation signal, which is not absorbed in the sensing volume 13, exits the sensing volume and forms the optical signal which is subsequently imaged on the optical sensor 18. In this case, the excitation signal 12 can be formed by a single laser beam which is used for excitation and detection.

Alternatively, the excitation and detection signals can be separate signals which are generated by separate sources, wherein only the detection signal is captured by the optical sensor 18.

The optical sensor can be any sensor which is able to resolve a spatial intensity distribution (i.e., an image pattern) of the optical signal (e.g., a camera, or an array of photodiodes).

The imaging system 15 can be configured to image the optical signal 14 from the sensing volume 13 to the optical sensor. For instance, the imaging system comprises two lenses 15-1, 15-2.

The attenuator 17 can be an optical filter. For instance, the optical filter is a spatial dependent filter which filters out DC and/or constant components from the optical signal. Thus, the imaging system 15 with the attenuator 17 can form a dark-field imaging system that only transmits non-DC components of the light and, thus, greatly reduces optical noise at the optical sensor 18.

The image plane 16 can be a focal plane of the first lens 15-1.

The optical filter can be a disk with a dark spot that blocks at least a portion of the light (e.g., a patch stop) or a line filter.

The processor 19 can be a microprocessor or controller. For instance, the processor 19 analyses the image pattern of the attenuated optical signal to determine the physical quantity (e.g., by a comparison of the frequency distribution or parts thereof with a database of known distributions or by feeding the distribution to an algorithm).

Figure 2:
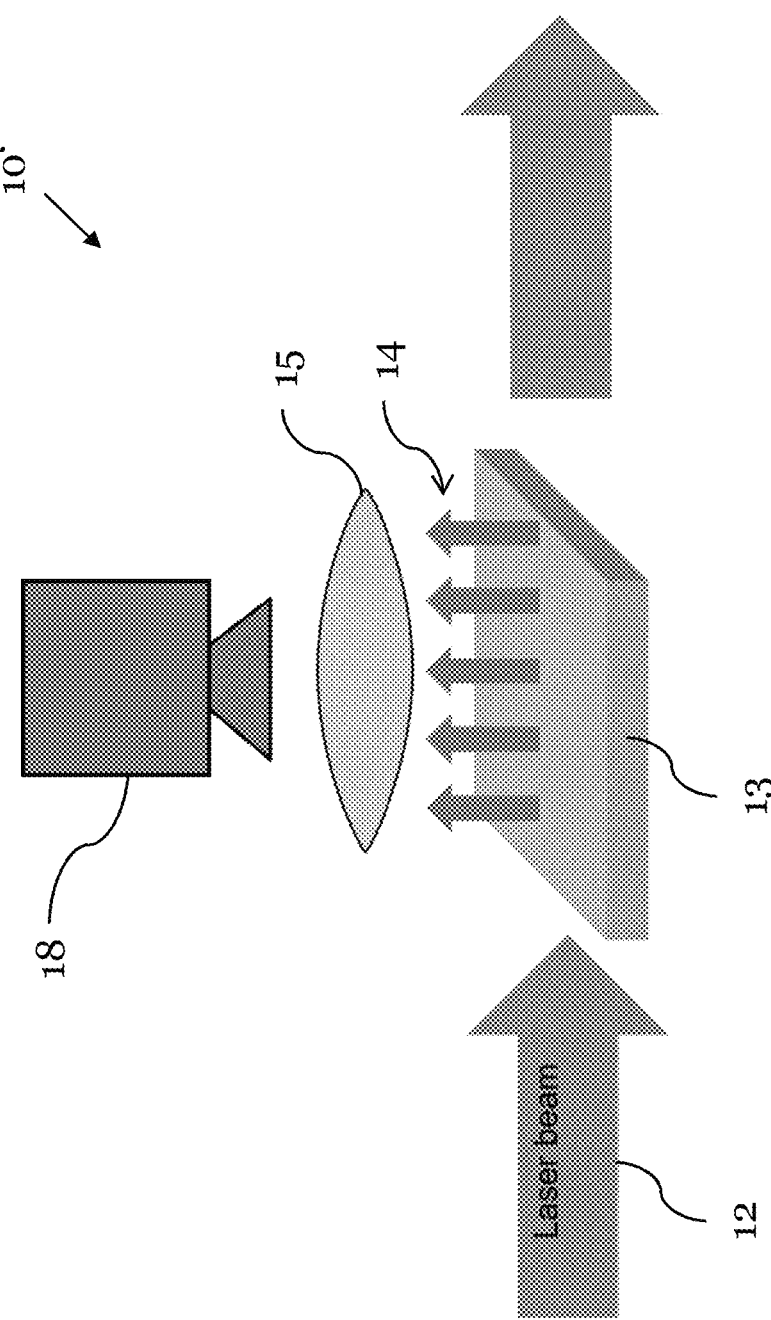
FIG. 2 shows a schematic diagram of a sensor system for sensing a physical quantity according to an embodiment.

FIG. 2 shows a sensor system 10' according to another embodiment. For instance, thereby the optical signal 14 is a fluorescence signal which is generated in response to an excitation of the sensing volume 13 by the excitation signal 12. Such a setup can be referred to as fluorescence setup.

The excitation signal 12 can be a laser signal, a microwave signal and/or a static electric and/or magnetic field.

In this case, the sensing volume 13 may comprise a diamond solid comprising one or more NV defects. The quantum systems in the sensing volume 13 may emit fluorescence light based on interactions with the excitation signal.

For instance, the z-dimension of the sensing volume 13 can be much thinner than the x- and y-dimensions. Alternatively, the sensing volume 13 may be thicker, but interactions only occur in a thin slice of quantum systems (e.g., excitation by a very elliptic laser beam).

The system 10' shown in FIG. 2 may comprise the same or similar imaging system 15, spatially dependent attenuator 17 and processor 19 as the system 10 shown in FIG. 1, which are, however, not shown in FIG. 2 for the sake of simplicity.

Typically, sensors based on NV diamonds are read out by analyzing their emitted fluorescence light with an optical detector (as shown in FIG. 2), while sensors based on atomic vapor cells are read out via the transmitted power of a laser beam (as shown in FIG. 1). However, in some cases, the response of NV centers can also be analyzed via a transmitted laser beam, and the response of atomic vapor cells can be analyzed via atom fluorescence.

Figure 3:
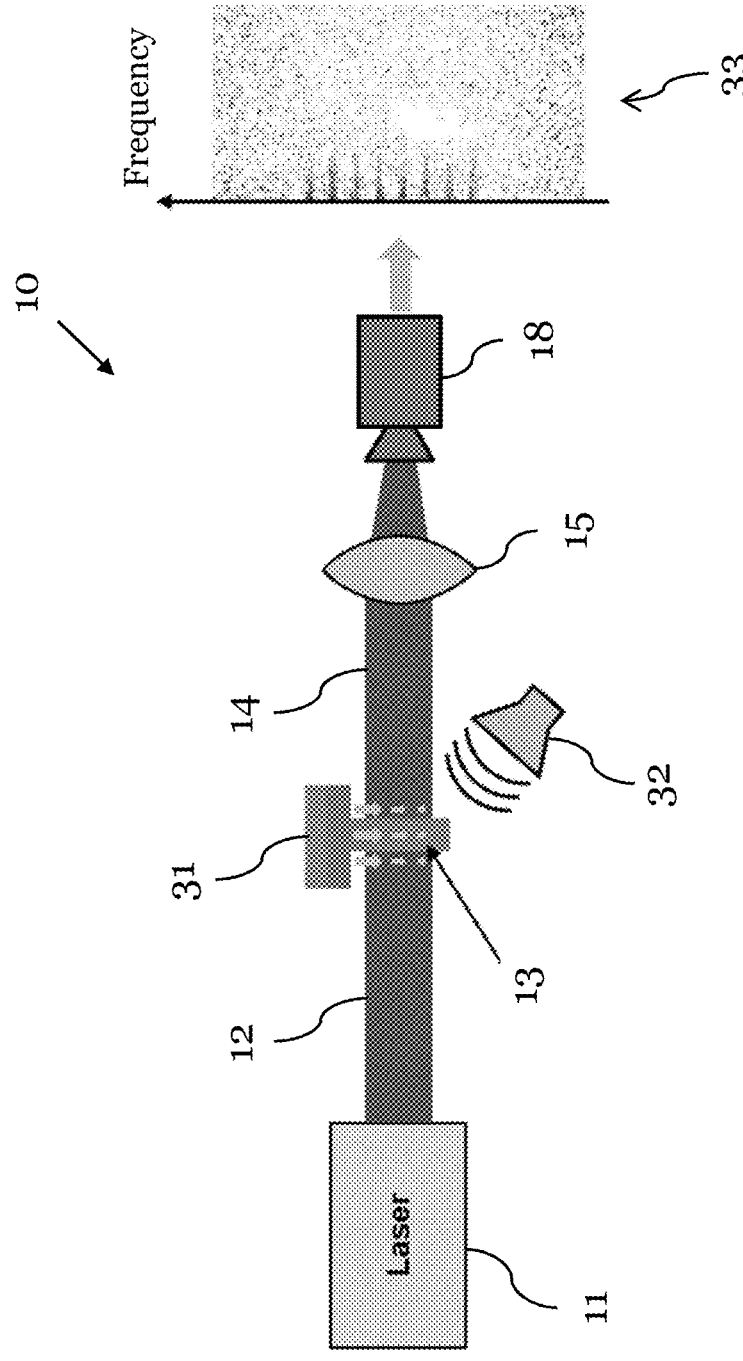
FIG. 3 shows a schematic diagram of a sensor system for sensing a physical quantity according to an embodiment.

FIG. 3 shows a schematic diagram of the sensor system 10 according to an embodiment. In particular, FIG. 3 shows a transmission analysis setup as shown in FIG. 1. For the sake of simplicity, the imaging system 15 is depicted by single lens and the attenuator 17 and the processor 19 are not shown in FIG. 3.

The system 10 shown in FIG. 3 further comprises a field generator 31 which is configured to generate an electric and/or magnetic field within the sensing volume 13. For instance the field generator 31 can comprise a magnet which forms an inhomogeneous magnetic field in the sensing volume 13, e.g. a vapor cell filled with gas.

The system 10 may further comprise an element 32 configured to guide and/or focus the physical quantity or an electromagnetic (EM) signal representative of and/or based on the physical quantity towards the sensing volume 13.

This element 32 can be an antenna and/or a waveguide. For instance, the antenna and/or waveguide guides an RF signal, e.g. a microwave signal, to be analyzed to the sensing volume 13. Depending on the frequency components of the applied RF signal, the sensing volume 13 imprints a certain unique pattern on the optical signal 14, which can be analyzed with the camera. An example of a resulting image 33 having such an imprinted pattern is shown in FIG. 3. The image 33 was generated based on a multicarrier signal to be measured.

Figures 4A, 4B:
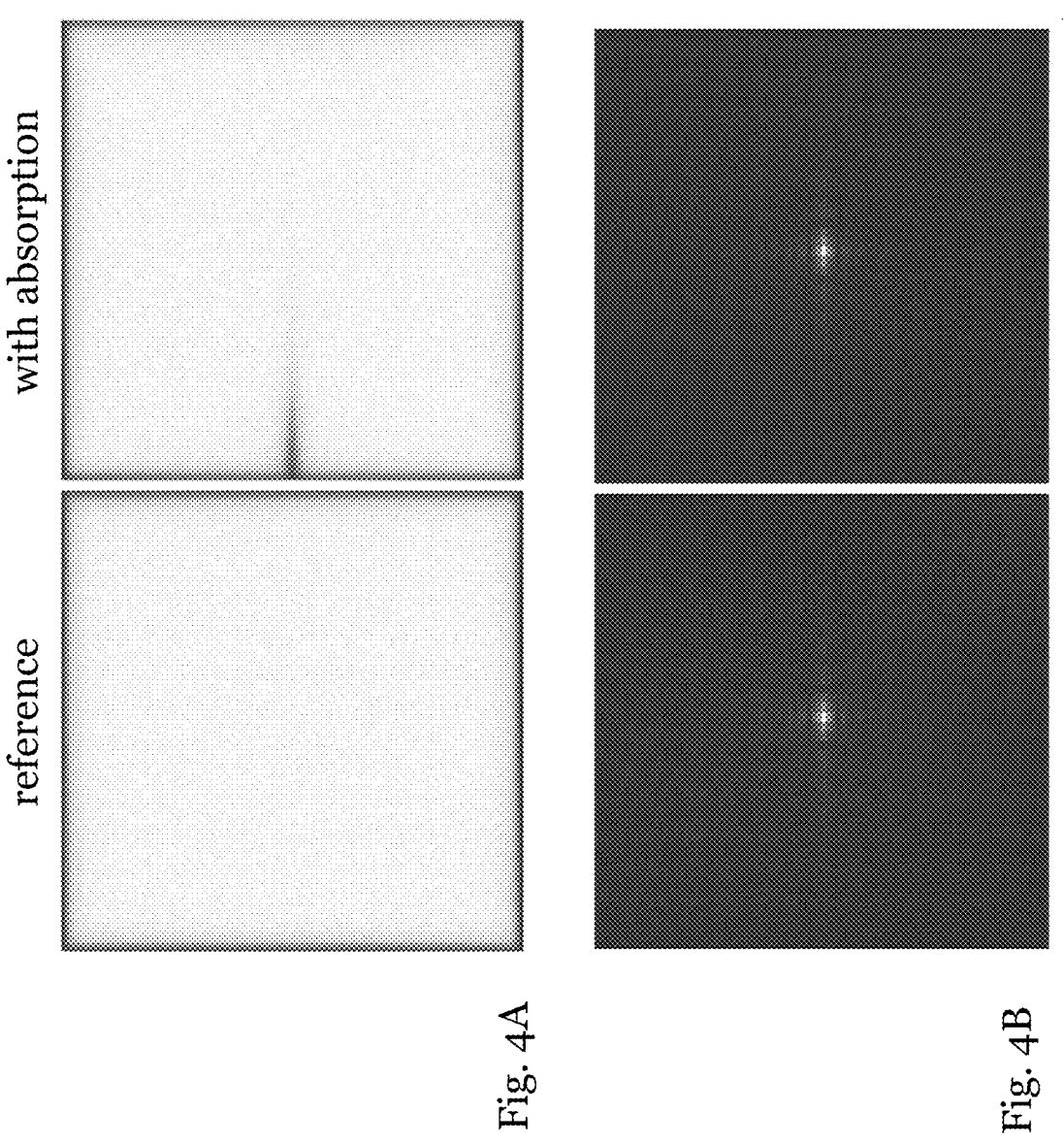
FIGS. 4A-4B show images recorded at different optical planes of a sensor system according to an embodiment.

FIGS. 4A-4B shows images recorded at different optical planes of the sensor system 10 according to an embodiment. In particular, the images were recorded with a transmission-based system, as shown in FIGS. 1 and 3, where the sensing volume comprises a gas in a vapor cell.

FIG. 4A shows images of the optical signal 14 that were recorded without an attenuator 17. Thus, these images show the optical signal as it looks directly after the sensing volume 13. In the left image, no physical quantity or signal to be measured is present (reference image), while in the right image, a physical quantity or signal is present causing a visible absorption pattern.

Typically, the sensing volume 13 (e.g., the vapor cell) is mostly transparent to the laser light of the excitation signal 12, i.e. it has a very high transmission. This leads to a large optical signal on most pixels of the camera image (white area). If a signal to be measured is present (right image), a line-shaped pattern appears. This pattern is visible by the camera because the gas in the vapor cell absorbs some photons, so the photon count on some camera pixels is slightly reduced.

However, due to the high number of photons that are transmitted by the vapor cell, the noise (in particular, photon shot noise) masks the influence of the physical quantity on the image (i.e., the visible absorption). The measured signal can also strongly fluctuate with a standard deviation. In order to detect an absorption, it should be bigger than the shot noise.

Further, such high photon counts require an optical sensor 18 with a high dynamic range. Most sensors have a saturation level, which is quickly reached.

These drawbacks, which occur if no imaging and attenuation is carried out, also apply when reading out a fluorescence signal from NV diamonds (e.g., with the setup shown in FIG. 2). This is because, if there is only a laser and no other interaction, the NV centers emit strong fluorescence. When adding a field to be measured to the NV centers, their response is usually a slight reduction of the fluorescence signal.

To overcome these issues, the sensor system 10 comprises the imaging system 15 and an attenuator which can be arranged as shown in FIG. 1. These elements form a dark field imaging systems, which strongly reduces the optical noise.

FIG. 4B shows images of the transformed optical signal 14 at the focal plane 16 of the imaging system 15 (as, e.g., shown in FIG. 1). In the focal plane 16, the first lens 15-1 can transform the initial optical pattern of the optical signal 14 from the sensing volume 13 into the Fourier transformation of this pattern. The images in FIG. 4B are images in Fourier space of a reference measurement (left image) and a measurement with an absorption due to a physical quantity (right image).

Figure 5:
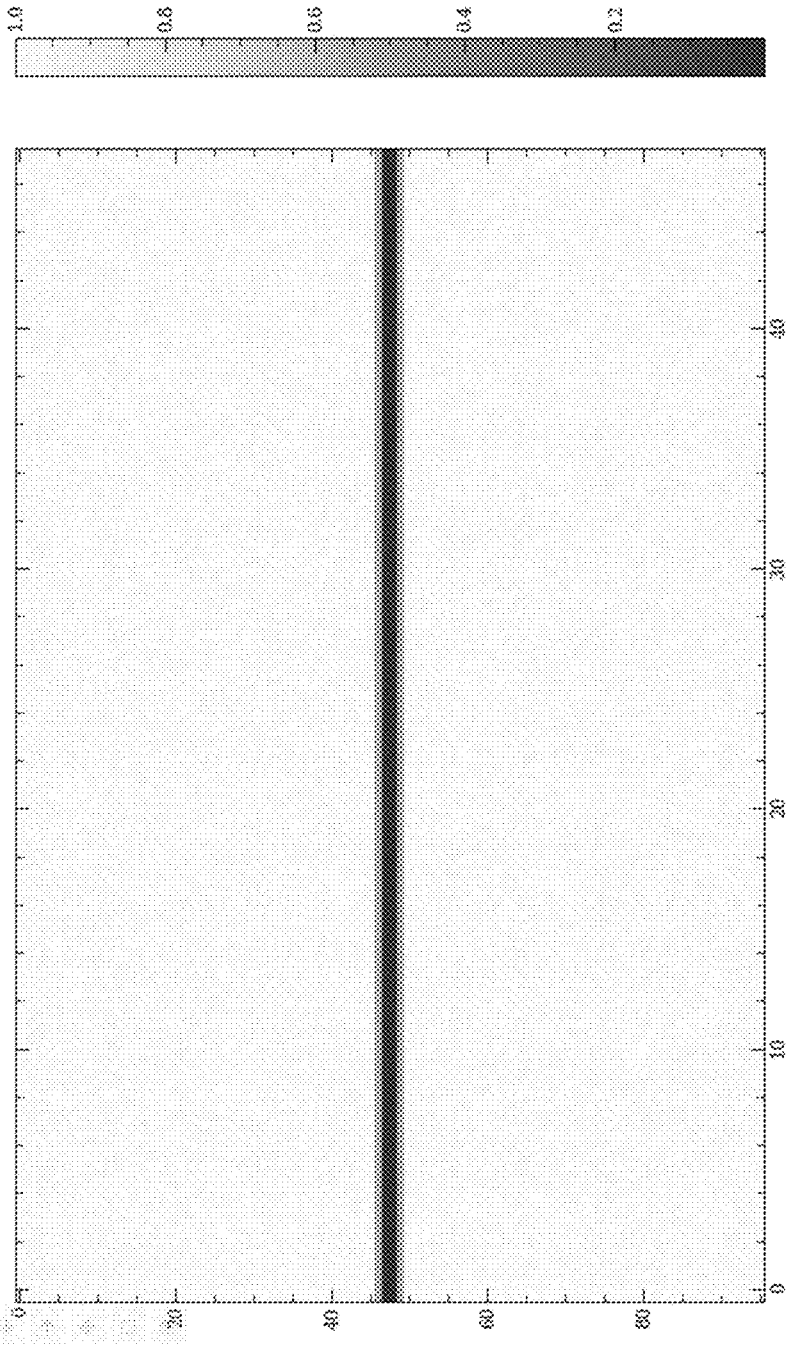
FIG. 5 shows an image recorded at an optical plane of a sensor system according to an embodiment.

FIG. 5 shows an image recorded at the Fourier plane of the sensor system 10 as, e.g., shown in FIG. 1 or 3, according to an embodiment. Thereby, an optical attenuator 17 in the form of a line-shaped absorber or filter is arranged in the Fourier plane:

For instance, the attenuator 17 is placed at the center of the Fourier image, because the center corresponds to low frequencies in the spectrum. This line-shaped absorber effectively absorbs DC frequency components of the initial image formed by the optical signal. Thereby, the filter can filter out frequency components of the image because the lens system has Fourier transformed the image.

Figure 6:
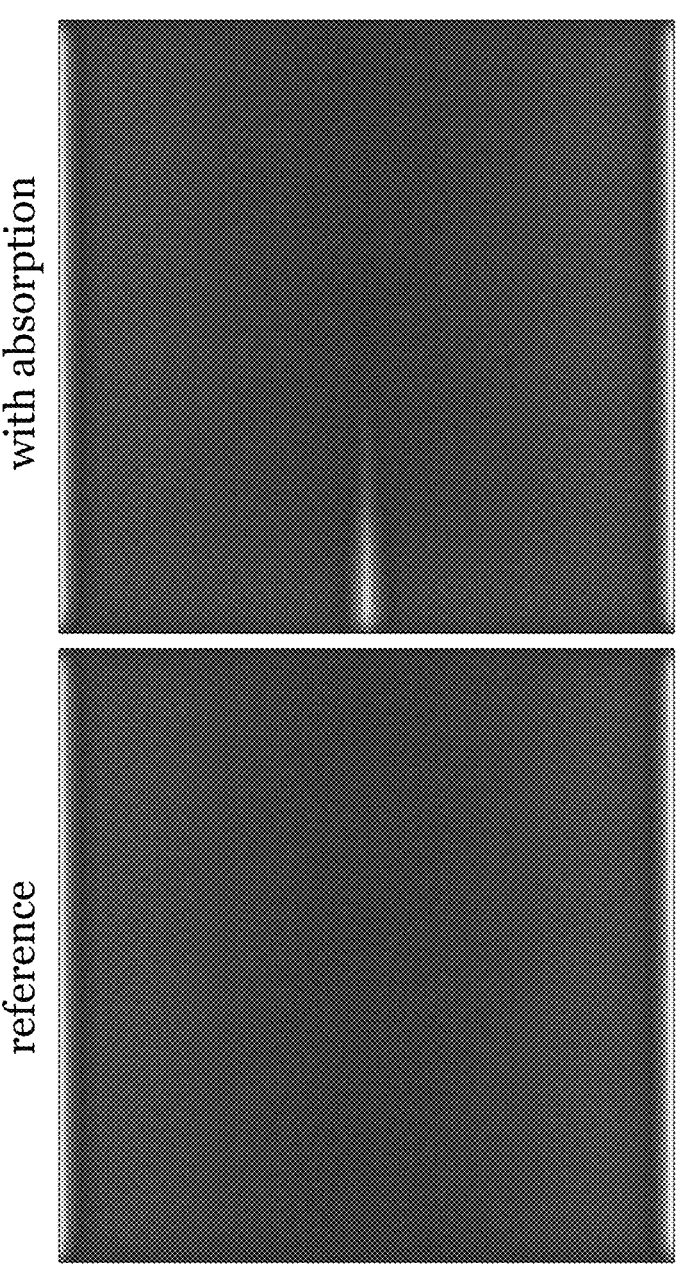
FIG. 6 shows images recorded at an optical plane of a sensor system according to an embodiment.

FIG. 6 shows the resulting images of the attenuated optical signal (attenuated with the line-shaped absorber of FIG. 5) as captured by the optical sensor 18. Again, a reference image (left) with no absorption is compared to an image with an absorption due to the presence of a physical quantity to be analyzed (right image).

For instance, the second lens 15-2 of the imaging system 15 performs an inverse Fourier transformation on the attenuated image in the Fourier plane (i.e., the image plane 16) and projects the resulting image on the optical sensor 18.

Instead of a white background (i.e., high photon count) as shown in FIG. 4A, the images show a mostly dark background (i.e., low photon count), because the DC components of the image are filtered out. The signal pattern of the absorption now adds photons to the background instead of removing photons.

This achieves the advantages that a higher sensitivity of the sensor can be achieved due to a drastically reduced photon shot noise of the background, and less photon counts are captured by the camera pixels, i.e., the demands on the dynamic range of the camera are reduced. This enables quantum sensing with higher sensitivity and dynamic range (e.g., in a quantum broadband receiver). For instance, an improvement of 10 dB can be expected.

Figure 7:
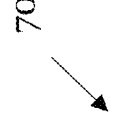
FIG. 7 shows a flow diagram of a method for sensing a physical quantity according to an embodiment.
Figure 7:
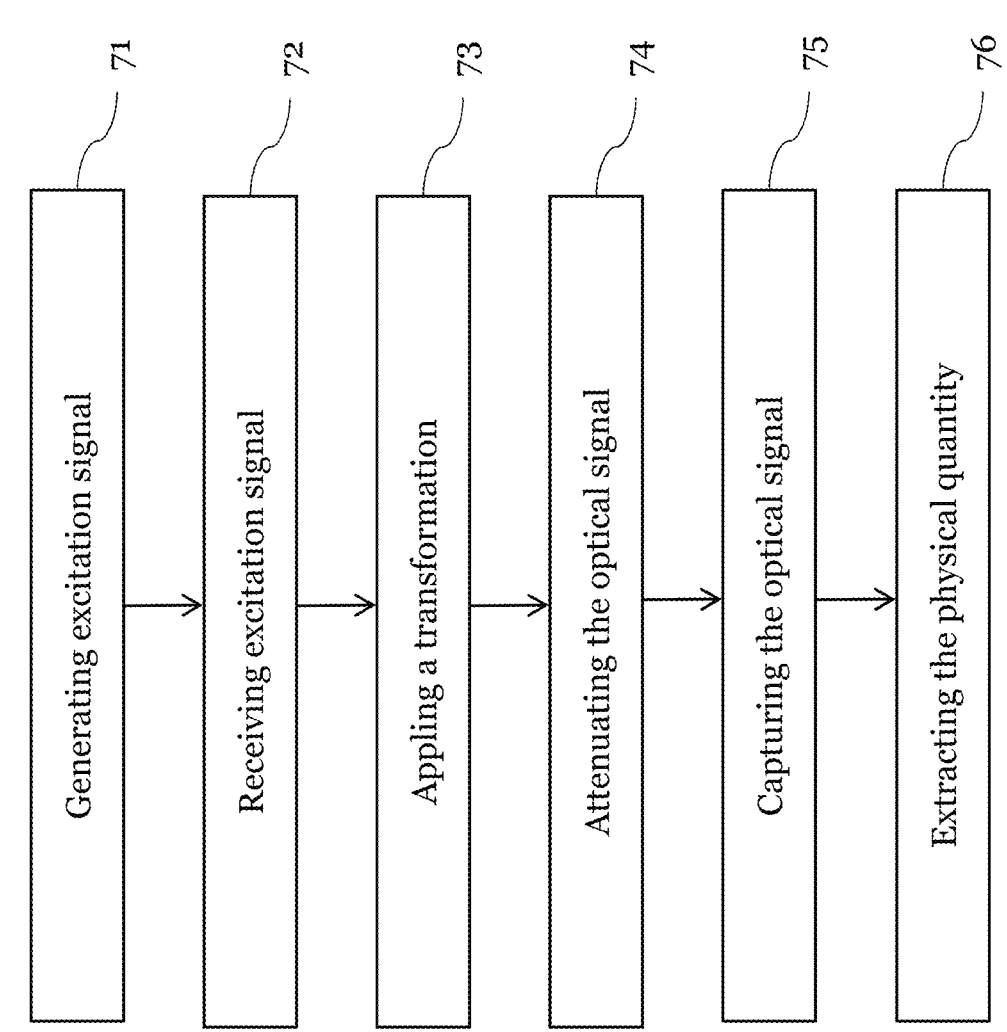

FIG. 7 shows a flow diagram of a method 70 for sensing a physical quantity according to an embodiment. This method 70 can be carried out by any one of the sensor systems 10, 10' shown in FIGS. 1-3.

The method 70 comprises the steps of: generating 71 an excitation signal 12; receiving 72 the excitation signal 12 at a sensing volume 13 which comprises one or more quantum systems; wherein the excitation signal 12 induces an emission and/or an adaption of an optical signal 14 by the sensing volume 13, and wherein at least one characteristic of the optical signal 14 depends on the physical quantity. The method 70 further comprises the steps of: applying 73 a transformation to the optical signal 14, thereby generating a transformed optical signal at an image plane 16; spatially attenuating 74 the transformed optical signal at the image plane; capturing 75 the thus attenuated optical signal to detect an image pattern of the optical signal; and extracting 76 an information on the physical quantity from the image pattern.

For instance, the step of spatially attenuating 74 the optical signal comprises filtering out DC or constant components from the optical signal.

The transformation that is applied to the optical signal 14 can be a Fourier transformation. Subsequently, an inverse Fourier transformation is applied to the attenuated optical signal.

The method may comprise the further step of: generating a magnetic and/or electric field in the sensing volume 13. For instance, the magnetic and/or electric field is in inhomogeneous magnetic and/or electric field, e.g. it has a field gradient in the sensing volume 13.

All features described above or features shown in the figures can be combined with each other in any advantageous manner within the scope of the disclosure.

The invention claimed is:

1. A sensor system for sensing a physical quantity, comprising:

an excitation source which is configured to generate an excitation signal;

a sensing volume comprising one or more quantum systems, wherein the sensing volume is arranged to receive the excitation signal, wherein the excitation signal excites resonant transitions between two energy states in the one or more quantum systems, wherein the excitation signal induces an emission and/or an adaption of an optical signal by the sensing volume, wherein at least one characteristic of the optical signal depends on the physical quantity;

an imaging system which is configured to apply a transformation to the optical signal, thereby generating a transformed optical signal at an image plane;

a spatially dependent attenuator which is arranged at the image plane and which is configured to attenuate the transformed optical signal;

an optical sensor which is configured to capture the thus attenuated optical signal and to detect an image pattern of the attenuated optical signal; and a processor which is configured to extract an information on the physical quantity from the captured image pattern.

2. The sensor system of claim 1,
wherein the spatially dependent attenuator is an optical filter, specifically a line filter.

3. The sensor system of claim 2,
wherein the optical filter is configured to filter out direct current (DC) components from an image pattern of the optical signal.

4. The sensor system of claim 1,
wherein the imaging system comprises a first lens which is configured to apply a Fourier transformation to an image pattern of the optical signal.

5. The sensor system of claim 4,
wherein the imaging system comprises a second lens which is configured to apply an inverse Fourier transformation to the image pattern of the attenuated optical signal.

6. The sensor system of claim 1,
wherein the sensing volume comprises a diamond solid comprising one or more nitrogen vacancy (NV) defects, wherein the optical signal is a fluorescence signal emitted by the sensing volume.

7. The sensor system of claim 1,
wherein the sensing volume comprises a gas, in particular a quantum gas, wherein the optical signal passes through the gas and is at least partially absorbed by the gas.

8. The sensor system of claim 7, further comprising:
a vapor cell configured to store the gas.

9. The sensor system of claim 1, further comprising:
a field generator which is configured to generate an electric and/or magnetic field within the sensing volume.

10. The sensor system of claim 1, further comprising:
an element which is configured to guide and/or focus the physical quantity or an electromagnetic (EM) signal representative of the physical quantity towards the sensing volume.

11. A method for sensing a physical quantity, comprising the steps of:
generating an excitation signal;
receiving the excitation signal at a sensing volume which comprises one or more quantum systems;
wherein the excitation signal induces an emission and/or an adaption of an optical signal by the sensing volume, wherein the excitation signal excites resonant transitions between two energy states in the one or more quantum systems, wherein at least one characteristic of the optical signal depends on the physical quantity;
applying a transformation to the optical signal, thereby generating a transformed optical signal at an image plane;
spatially attenuating the transformed optical signal at the image plane;
capturing the thus attenuated optical signal and detecting an image pattern of the attenuated optical signal; and
extracting an information on the physical quantity from the captured image pattern.

12. The method of claim 11,
wherein the step of spatially attenuating the optical signal comprises filtering out direct current (DC) components from the optical signal.

13. The method of claim 11,
wherein the transformation that is applied to the optical signal is a Fourier transformation which is applied to an image pattern of the optical signal.

14. The method of claim 13,
wherein an inverse Fourier transformation is applied to the image pattern of the attenuated optical signal.

15. The method of claim 11, further comprising the step of:
generating a magnetic and/or electric field in the sensing volume.

* * * * *